(12) United States Patent
Verger et al.

(10) Patent No.: US 6,420,710 B1
(45) Date of Patent: Jul. 16, 2002

(54) DEVICE FOR SPECTROMETRIC MEASUREMENT IN THE FIELD OF GAMMA PHOTON DETECTION

(75) Inventors: Loïck Verger; Jean-Paul Bonnefoy, both of Grenoble; Jean-Pierre Rostaing, La Cote Saint Andre, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/463,973
(22) PCT Filed: Aug. 14, 1997
(86) PCT No.: PCT/FR98/01807
§ 371 (c)(1), (2), (4) Date: Feb. 14, 2000
(87) PCT Pub. No.: WO99/09432
PCT Pub. Date: Feb. 25, 1999

(30) Foreign Application Priority Data

Aug. 14, 1997 (FR) .............................................. 97 10392

(51) Int. Cl.[7] .................................................. G02T 1/24
(52) U.S. Cl. ............................... 250/370.06; 250/370.13
(58) Field of Search ....................... 250/370.13, 370.12, 250/370.14, 370.06, 370.01, 371

(56) References Cited

U.S. PATENT DOCUMENTS

| | | | | |
|---|---|---|---|---|
| 4,243,885 A | * | 1/1981 | Agouridis et al. | ..... 250/370.13 |
| 5,391,881 A | * | 2/1995 | Jeuch et al. | ........... 250/370.09 |
| 5,627,377 A | * | 5/1997 | Hamilton, Jr. et al. | .. 250/370.13 |
| 5,854,489 A | * | 12/1998 | Verger et al. | .......... 250/370.06 |

* cited by examiner

Primary Examiner—Georgia Epps
Assistant Examiner—Richard Hanig
(74) Attorney, Agent, or Firm—Oblon, Spivak, McClelland, Maier & Neustadt, P.C.

(57) ABSTRACT

A semiconductor base device for the detection of gamma radiation. The semiconductor base device includes a semiconductor base detector with a resistivity exceeding $10^9$ Ω·cm. An operational amplifier is located directly at the detector output, without a decoupling capacitor between the detector and the preamplifier. A data processing device makes use of the rise time of the electronic component of a signal output by the detector.

28 Claims, 3 Drawing Sheets

DEVICE FOR SPECTROMETRIC MEASUREMENT IN THE FIELD OF GAMMA PHOTON DETECTION

BACKGROUND OF THE INVENTION

1. Field of the Invention

This invention is related to the domain of γ radiation detection, the detector used being a semiconductor. It also relates to the field of spectrometric measurements in γ imagery.

2. Discussion of the Background

Many types of detectors have been designed for detection of γ radiation. The main innovation in γ radiation detection techniques over the last 30 years has been the use of solid detectors based on semiconductors.

Detectors based on semiconductors convert γ radiation in the material into energy directly without using any intermediate steps such as the emission of visible photons in the case of scintillators. This overcomes coupling problems that introduce loss of efficiency. The energy necessary to create an electron-hole pair in a semiconductor is much lower than in a gas or in a scintillator (about 4 eV for semiconductors compared with 30 eV in gases and 300 eV in photomultiplier scintillator systems). Consequently, the number of free charges created for each detected photon is much higher, which can give better energy resolutions with low noise. Furthermore, the high atomic number and the high density of semiconductor materials make it possible to use detection volumes significantly smaller than the volumes of gas detectors or scintillators, while keeping the same quantic detection efficiency.

The use of these semiconductor materials as X or γ radiation detectors implies the deposition of two electrical contacts on the surface of the material, at the terminals of which a polarization voltage is applied. Charge carriers, in other words electron-hole pairs created by the interaction of a γ photon with the material, will separate under the action of the electrical field, the electrons migrating towards the positive electrode and the holes migrating towards the negative electrode. The capability of these charge carriers to migrate towards the electrodes without getting trapped by defects present in the semiconductor material will affect the energy resolution of the measured spectrum. This capability, also called the charge carrier transport property, is measured by the mobility and the life of the electrons and the holes.

The spectrometric measurement of incident photons consists of detecting the maximum number of photons within the detector volume, which requires a high thickness for better quantic detection efficiency, and precisely measuring the energy deposited by the photon, which requires an excellent efficiency for the collection of holes and electrons migrating towards the negative and positive electrodes respectively. These two parameters (quantic detection efficiency and charge carrier collection efficiency) are contradictory, since the former is proportional to the detector thickness, and the latter is inversely proportional to the detector thickness.

The quantic detection efficiency can be improved by optimizing the detector thickness compared with the field of application, since it only depends on the density and atomic number of the detector (for a given energy of incident photons).

However, the performances of current γ detectors are limited by the presence of native defects in semiconductors which trap charge carriers during their migration towards electrodes, and correspondingly reduce their life and thus deteriorate the energy resolution of the detector. These native defects systematically appear during crystallogenesis of the semi-conducting material. There is a very abundant bibliography on the study of these defects that shows that the crystallogenesis of all high resistivity semiconductors that can operate at ambient temperature is not controlled sufficiently well to eliminate these defects.

The collection efficiency of charge carriers (holes and electrons) may be improved in different ways described in document EP-763 751.

This document also describes a process for the correction of the spectrometric measurement in the field of γ photon detection.

This process consists of measuring the amplitude of the electronic contribution alone as a function only of its rise time (called the "electron" correction method) rather than measuring the total amplitude of the total integrated signal (electron+hole) as a function of its rise time (called the "hole" correction method described in FR-2 738 693). The measurement, and consequently mathematical knowledge of the function correlating the amplitude of the electron signal and its rise time, is used to correct the measured amplitude associated with the interaction of each photon throughout the volume of the detector.

The advantage of the "electron" correction is that the existing relation between the amplitude of the electron signal and its rise time only depends on the mobility of the electrons that varies only slightly within an ingot and between two different ingots; the mobility depends mainly on the crystalline network. However, the "holes" correction depends on the life of the holes, and variations in this life can vary significantly within a single ingot. This life is imposed by the different defects created during crystallogenesis which is not well controlled. One consequence of these differences is that the "electron" correction can correct measurements in most semi-conducting materials, but this is not the case for the "hole" correction.

The two documents mentioned above each describe a device for making or for correcting spectrometric measurements.

In both cases, a conventional preamplifier is used just at the detector output, followed by special electronics to measure the signal amplitude (electronic component in EP-763 751 and global signal in FR-2 738 693) and its rise time.

In both cases, the signal is measured using a conventional commercially available charge preamplifier well known to the expert in the subject (for example a 5093 preamplifier purchased from eV-Products).

FIG. 1 diagrammatically shows a detector 2, for example a CdTe detector and its preamplifier 4.

The charge deposited by the photon absorbed by detector 2 is integrated at the terminals of a capacitor $C_i$ 8 called the "integration" capacitor. This capacitor counter-reacts with a resistance $R_i$ 10 (through the use of an operational preamplifier) that "discharges" the integrated charge at the capacitor terminals. The time constant $R_i$, $C_i$ may be adapted as a function of the nature of the semiconductor and the charge to be measured.

In all cases, the darkness current associated with the detector is not measured and is therefore integrated at the terminals of the capacitor $C_i$, since its absolute value is still much too high. It is greater than the charge deposited by the photon interacting in the detector. It depends on the resistivity of the semiconductor and also on the polarization voltage applied to the detector terminals. However, the polarization voltage must be sufficient to collect charges deposited by each photon and thus measure their energy. The low charge transport properties (mobility and life) require polarization voltages (between 100 and 500 Volts depending on the detector thickness) for which the darkness current remains high. Consequently, a "decoupling" capacitor 12 is inserted between the detector and the capacitor. This capacitor 12 eliminates the DC component of the darkness current and only transient pulses corresponding to the various interactions of photons in the detector are considered. This measurement principle is now the only possible configuration from the "electronic" point of view that can be used to measure the deposited charge without it being "drowned" by the darkness current.

Unfortunately, this configuration is not electronically optimized in terms of the signal/noise ratio, since inserting the "decoupling" capacitor 12 has the disadvantage of introducing a "parasite capacitance" between the input of the preamplifier and the electrical ground (voltage reference). The effect at the preamplifier output is to multiply the preamplifier noise voltage in the ratio $\Sigma C_{in}/C_i$, which is the sum of the capacitances with respect to the ground to $C_i$, the integration capacitance, which increases the noise component produced by the electronic amplification device.

The decoupling capacitor has been eliminated in a conventional spectrometry system (A. C. Huber et al. "High Performance, thermoelectrically cooled X-Ray and Gamma Ray detectors", Invited Paper at the International Conference on the Application of Accelerators in Research and Industry, Denton, Tex., USA, November 1994).

But the CdTe detector used then has to be cooled (to −30 C.) in order to reduce the average value of the darkness current. The performances are then good but Peltier elements have to be used for each detector. The result is that it is difficult to use, for example in an imagery system composed of 1600 detectors.

SUMMARY OF THE INVENTION

The invention is designed to solve this problem.

More particularly, the purpose of the invention is a semiconductor based device for the detection of gamma radiation comprising:
- a semiconductor based detector with a resistivity exceeding $10^9$ Ω·cm,
- a charge preamplifier located directly at the detector output, without a decoupling capacitor and without a polarization resistance between the detector and the preamplifier,
- a device for the use of a signal or a set of data representative of the variation with time of a signal output by the said semiconductor based detector in response to the interaction of a γ photon with the semi-conducting material, this device comprising means of producing data or a signal representative of the rise time of the electronic component of the total signal output by the detector, in other words the component of the signal that corresponds to the collection of electrons originating from the interaction between each γ photon and the semiconductor material.

The device for the use of a signal may also comprise:
- means of producing data or a signal representative of either the total detected charge or the part of the total charge resulting from the collection of electrons,
- or means of producing data or a signal representative of an amplitude of the electronic component of the signal, or an amplitude of the total signal.

Another purpose of the invention is a semiconductor based device for the detection of gamma radiation comprising:
- a semiconductor based detector with a resistivity exceeding $10^9$ Ω·cm,
- an operational preamplifier located directly at the detector output, without a decoupling capacitor between the detector and the preamplifier,
- a device for the use of a number of signals or a number of data sets, each being representative of the variation with time of a signal output by the semiconductor based detector, in response to the interaction of a γ photon with the semi-conducting material, this device comprising:
    means of producing data or a signal representative of the rise time of the electronic component of the total signal output by the detector, for each signal or data set, in other words the component of the signal that corresponds to the collection of electrons originating from the interaction of each γ photon with the semi-conducting material,
    and means of establishing a relation, or a correlation, between firstly a first data set representing the rise times of electronic components, and secondly a second data set representing total detected charges or charges resulting from the collection of electrons.

The device for the use of a number of signals may also include means of producing a signal or data representative of the maximum electrical charge or the maximum charge corresponding to at least part of the first and second data sets.

Another purpose of the invention is a semiconductor based device for the detection of γ radiation comprising:
- a semiconductor based detector with a resistivity exceeding $10^9$ Ω·cm,
- an operational preamplifier located directly at the detector output, without a decoupling capacitor between the detector and the preamplifier,
- a device for the use of a signal, or a data set representative of the variation with time of a signal obtained by the semiconductor based detector in response to the interaction of a γ photon to be measured with the semi-conducting material, comprising:
- means of producing data or a signal representative of the rise time of the electronic component of the signal output by the detector, in other words the component of the signal that corresponds to the collection of electrons originating from the interaction of the γ photon with the semi-conducting material,
- means of producing data or a signal representative of either the total detected charge, or the part of the total charge resulting from the collection of electrons,
- means of determining a maximum electrical charge, starting from:
- signals or data about:
- the rise time of the electronic component of the signal,
- the total detected charge or the part of the total charge resulting from the collection of electrons,
- and starting from a relation, or correlation, between firstly a first data set representative of the rise times of the electronic components, and secondly a second data set representing the total detected charges or charges resulting from the collection of electrons.

This device may also comprise means of correcting the measured charge starting from the maximum charge, the rise time corresponding to this maximum charge, and the actually measured rise time.

Advantageously, the charge preamplifier is fast and low noise.

A semiconductor based detector for the invention may be made of cadmium telluride (CdTe or CdTe:C1) or CdZnTe (for example CdZnTe:C1) or $HgI_2$ or $PbI_2$ or GaAl or PbIn; this material is derived from the "High Pressure Bridgman method", or the HPBM method, and the resistivity obtained is ten times greater than the resistivity of CdTe materials known in the past (obtained using the "Traveling Heater Method (THM) or the "Bridgman Method" (BM) ), at ambient temperature. The low polarization current of the detector can then be carried by the counter-reaction resistance, by eliminating the connecting capacitor 12 and the polarization resistor 16. One advantage of this is the disappearance of the parasite capacitance of the connecting capacitor and therefore an improvement in the inherent noise of the electronics associated with the detector.

The invention has other advantages for detecting γ photons. In particular, eliminating the decoupling capacitor and the associated polarization resistor reduces the number of components associated with each detector, which in the case of a matrix structure facilitates manufacture of the integrated electronics (in the case of an ASIC type production), and limits its cost. Furthermore, a low polarization voltage can be used at the detector terminals while maintaining excellent detection performances; this limits the darkness current and therefore aging of the detector, and the noise associated with the integrated charge measurement.

Use of the operation process correction method as described in document EP-763 751 ("electron" correction method) can very significantly improve the performances of a semiconductor based detector at ambient temperature, in terms of energy resolution and detection efficiency. The combination of this method with the use of a detector according to the invention with a resistivity greater than $10^9$ $\Omega\cdot cm$, can maintain these excellent detector performances while using a very low polarization voltage at the terminals of the electrodes placed on each side of the detector faces. The very high resistivity of the detector used, and the use of the "electron" correction method increase the performances associated with the "electron" correction method by eliminating the decoupling capacitor at ambient temperature.

The combination of the high resistivity detector with the "electron" correction method considerably reduces the average value of the darkness current, and the associated noise. Obtaining a very low darkness current eliminates the decoupling capacitor and thus improves the noise associated with the measurement.

The invention also relates to a gamma-camera with a number N of small detectors operating at ambient temperature, each detector being of the type described above. Therefore, this gives a γ imagery device with improved performances, particularly in terms of energy resolution and image contrast. Furthermore, manufacturing costs are reduced by the elimination of two electronic components, the decoupling capacitor and the polarization resistor in each detector.

Another purpose of the invention is a process for the detection of γ radiation embodying the device described above.

BRIEF DESCRIPTION OF THE DRAWINGS

The characteristics and advantages of the invention will become easier to understand after reading the following description. This description applies to example embodiments given for explanatory purposes and in no way restrictive, with reference to the attached drawings on which.

DESCRIPTION OF THE PREFERRED EMBODIMENTS

Figure 2:
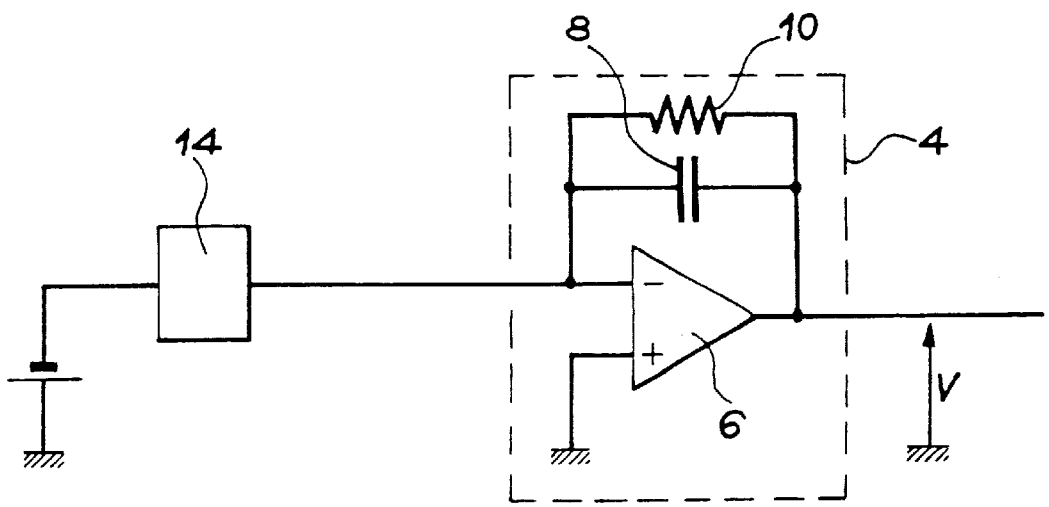
FIG. 2 diagrammatically shows a device according to the invention.

FIG. 2 shows an embodiment of a device according to the invention.

A semiconductor based detector 14 with high resistivity (greater than $10^9$ $\Omega\cdot cm$) is connected to a preamplifier 4 composed of an operational amplifier 6 and an integration capacitor 8. The capacitor is in counter-reaction with a resistor 10 that discharges the charge built up at its terminals. For example, the detector may be based on cadmium telluride (CdTe or CdZnTe) or on $HgI_2$ or $PbI_2$. For example, the materials from which this detector is made are obtained using the HPBM method; this method can give materials with a resistivity ten times higher than the resistivity of known materials usually used in γ spectrometry (detectors operating at ambient temperature).

According to another criterion, a material is chosen for which the product of the mobility of electrons by their life is greater than $10^{-4}$ $cm^2/Volt$.

According to the invention, this type of detector can avoid the need for a decoupling capacitor between detector 14 and preamplifier 4.

Preferably, the thickness of the detector is between 3 and 6 mm, and it operates with voltages of between 100 and 500 Volts applied between its two electrodes.

Advantageously, this detector may be operated at ambient temperature using a process and a device for the correction of spectrometric measurements within the γ photon detection range, of the type described in document EP-763 751.

Figure 3:
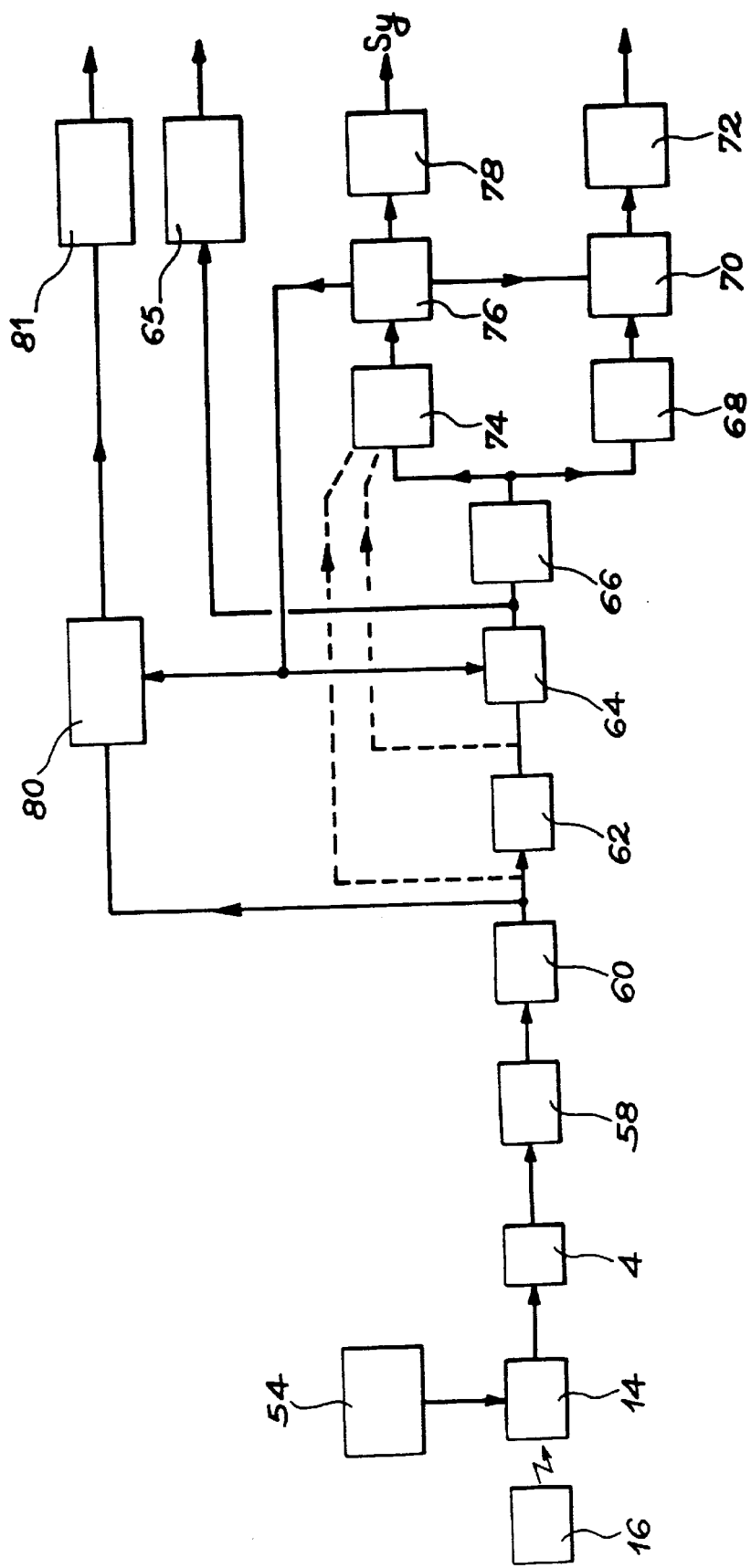
FIG. 3 shows a device for the correction of spectrometric measurements in the field of γ photon detection.

This type of device will now briefly be summarized with reference to FIG. 3.

In this figure, reference 16 denotes a radiation source that emits γ photons towards a semiconductor detector 14 of the type described above.

Furthermore, means 54 are provided so that the polarization of the detector can be chosen.

Charges are collected in response to the interaction of a γ photon with the semi-conducting material of detector 14. The signal corresponding to the collected charges is available at the output from the charge preamplifier 4 (for example an eV 5093 preamplifier).

The output signal from the charge preamplifier 4 is transmitted to a read preamplifier 58, with a gain that can be adjusted for example between 1 and 3. Means may also be provided for adjusting the signal polarity. Means 60 combine an amplifier and a high pass filter. The high pass filter rejects all DC components.

The amplified and filtered signal is then input into a high pass filter 62. This filter rejects the slow signal, in other words the slow component of the signal which is due to the holes. Therefore, the output signal corresponds to the electronic component of the total signal.

The time constant of the high pass filter 62 is chosen to be very small compared with the hole collection time and greater than or equal to or comparable to the electron collection time.

Therefore, a signal representative of the variation of the electronic component alone with time is transmitted to a peak detector 64, a discriminator 66 of a rise towards the signal peak being connected to the output of the peak detector. The discriminator includes a transistor, for example a 2N 2894 transistor, that charges a capacitor up to the signal peak level. A voltage is observed at the output, indicating that the transistor is charging the capacitor. When the signal has passed through its peak, the charge is stopped and the collector voltage is cancelled out.

The signal obtained at the output from the discriminator 66 is transmitted to means 68 that are used to determine the end of rise time $t_1$ of the electronic component of the total signal. The collector voltage of the transistor in discriminator 66 is applied to a comparator. Consequently, during the charge, in other words during the rise time of the electronic component, a current of about 2 milliamperes is applied to the input of an integrator 70, the integration capacitance of the integrator being selected at the same time as the constant of the high pass filter 62. Logical signals control the integration phase. An amplifier-adapter 72 follows the integrator and outputs a signal, or a voltage, proportional to the fast migration time that is a good approximation of the electron collection time, in other words the rise time of the electronic component.

The output signal from the discriminator 66 or the preamplified and then filtered signal taken from the output from means 60 or 62, is also used to trigger threshold detection means 74 detecting the beginning of the signal rise. This is done by comparing the preamplified and filtered signal with a low threshold. When this low threshold is crossed, an output signal is sent from means 74 to means 76 triggering an integration sequence in time and resetting the integrator 70 at the end of the sequence. These means 76 also transmit a reset signal to the peak detector 64 at the end of the sequence. An adapter 78 at the output from means 76 generates a synchronization signal Sy.

The peak detector 80 samples a signal at the output from the high pass amplifier-filter assembly 60. This peak detector 80 may be composed in a manner similar to detector 64. An adapter 65, 81 at the output of each of these detectors 64, 80 is used to obtain a signal representative of the amplitude, in other words the charge of the electronic component of the total signal, or of the total signal itself (electronic component+hole component).

As described in document EP-763 751, the information about the rise time of the electronic component and the information about the amplitude or the charge of the electronic component of the total signal, or of the total signal itself, may be used by producing a signal or data representative of the maximum charge $Q_m$, or the maximum amplitude of the total signal, which would have been detected if the signal had operated without losses.

Correlation data may firstly be set up using a curves network. Each measurement of a pair of data (rise time, amplitude or charge of the electronic component or the total signal) can then be compared with this type of curves network.

Instead of using a curves network, it would also be possible to memorize all data about correlations (curve, energy) in storage means, for example in a conventional computer. A measurement $(Q_m, \tau_m)$ can then be assigned to a curve and a given energy using computer means, for example using the same computer specially programmed for this purpose. Means of displaying data, for example in graphic form, may also be provided.

It would then be possible to make a correction, either by dedicated electronics or by computer. Therefore, regardless of the specific case, the principle consists of measuring the signal rise time and its amplitude, and obtaining the maximum amplitude that should have been measured, making use of the relation, or the correlation, between the measured charges and rise times.

Thus, if the established correlation is linear, the charge $Q_c$ obtained by correction is given by the following relation:

$$Q_c = Q_m \times \tau_0 / \tau_m$$

where $Q_m$ represents the measured charge, $\tau_m$ the measured rise time of the electronic component and $\tau_0$ the rise time associated with the maximum charge $Q_0$, obtained after comparing the measurement pair $(\tau_0, Q_m)$ with the previously established relations or correlations.

All this is equally true for a semi-conducting material in which the electronic signal alone remains, and for a semi-conducting material in which the hole signal exists, even though it may be very small. In the latter case, the signal comprises firstly an electronic component that corresponds to the collection of electrons, and secondly a hole component that corresponds to the collection of holes. The electronic component may be isolated or identified by temporal differentiation or filtration. Consequently, the case in which the electronic signal exists alone can arise; the amplitude of the measured signal $Q_m$ and the measured rise time $\tau_m$ of the electronic component are identified, and these results are compared with the correlations.

A larger signal/noise ratio can also be achieved by measuring the amplitude of the total signal (electronic component+hole component) and the rise time of the electronic component, and comparing these data with a previously established correlation between the total amplitude of the signals and the rise times of the electronic components of these signals. In this case, the correlations are no longer necessarily linear, but as mentioned above, the signal/noise ratio is larger. This thus gives the maximum total charge that would have been measured if the interaction had taken place close to the cathode.

Other information and examples on the data processing procedure are given in document EP-763 751.

Figure 1:
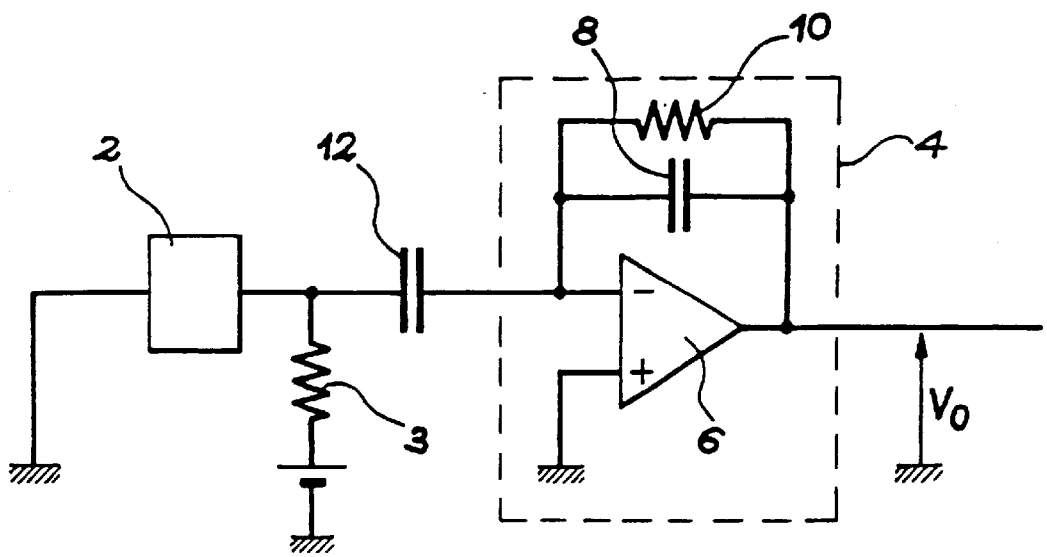
FIG. 1 shows a device according to prior art.

The charge preamplifier 6 forms one conventional means of using the signal output from a solid CdTe type detector activated by a photon (FIG. 1).

The charge preamplifier is composed of an amplifier A, with a counter-reaction (or integration) capacitor 8 (Ci), and a counter-reaction resistor 10 (Ri), designed to fix the circuit rest point (see FIG. 1).

When working as an integrator, the charge preamplifier outputs a voltage V proportional to the received charge Q, V=Q/Ci.

The amplifier 6 has:

a gain G (as high as possible), a noise voltage and current (as low as possible).

Regarding noise, the impedance of the source determines the choice of the technology used.

A conventional means of polarizing the detector is to put a resistor 3 (Rp) in series with it in the polarization circuit, in this case a high voltage source.

The detector current in the absence of a signal, denoted Ip and called the darkness current, is not equal to zero and is usually variable depending on the manufacture, temperature, etc.

The resistance is high (typically greater than 50 megohm in the application described) so that its noise current is negligible compared with the detector noise current.

The result is a difference in potential UO=Rpxlp at the terminals of the resistor, which is equally variable.

A connecting capacitor 12 (C1), "cuts off" this DC component and only allows fast current variations to pass, particularly variations produced by the useful signal due to the interaction of the photon in the semi-conducting material.

Note that all components (resistor, capacitor, amplifier, etc.) have a capacitance with respect to the common power supply ground that forms the potential reference. This capacitance, called the parasite capacitance denoted Cpar, has a multiplying effect in this case, multiplying the noise voltage Eea output from the preamplifier by $\Sigma(Cpar)/Cf$.

It may be desirable to reduce the number of components in order to improve performances by reducing noise and/or for economic reasons (cost reduction).

The connecting capacitor C1 is eliminated, and the detector polarization and the preamplifier counter-reaction are thus provided in the same component, the resistance 10 Ri (FIG. 2).

The time constant $Ti=Ri\times Ci$ fixes the frequency integration (usage) domain of the circuit. Therefore, it is related to the time aspect of the signal to be processed, and specifically with the electron transit time in the semi-conducting material, denoted te; Ti>>te max (for example Ti>10 te max), where te max is the maximum electron transit time. For a given detector, it is determined after the voltage V applied to the detector terminals is fixed. It corresponds to the case in which the impact point is located on or close to the cathode.

Furthermore, preferably an attempt is made to not saturate the amplifier 6. Therefore, the preamplifier output and input are preferably between 0 (the ground) and VDD. This is done by attempting to obtain RIxIp<VDD, where VDD is the preamplifier power supply voltage (for example RixIp ½VDD or ½VDD or Ri Ip<<VDD). Therefore, the product Ri Ip depends on the power supply voltage VDD of the amplifier 6.

In general, an operating process for a detection device according to the invention, with the detector being set at a given voltage (therefore with a given te max) and the amplifier being powered at a voltage VDD, will be designed such that Ti>>te max, and/or Ri Ip<VDD.

Finally, if it is also required to obtain a large or maximum signal to noise ratio, the value of Ci should be chosen to be as small as possible and the value of Ri should be as large as possible.

The characteristics of the detector (te max, Ip) may be such that there is a possible solution to all of these constraints:

Ti=RixCi>>te max (≈1 µs), compatible with the integration domain related to the path of the electrons, large signal/noise ratio=<Ci<0.5 pF; Ri>50 Mohm, RixIp<<VDD≲Ip<<VDD/Ri=5/(5×10$^7$)=100 nA, so that the amplifier is not saturated (for example Ip=20 nA or Ip≈20 nA).

These conditions express compatibility with the detector.

Considering the very low values of capacitance used, the advantage of miniaturization of the components becomes obvious. Values of this order of magnitude are very difficult to obtain in fully discrete electronics, can be made (since they have been made) in hybrid electronics, and are easily achievable in integrated electronics.

Circuits of this type have been made using 0.8 µm CMOS technology.

Comparative measurements have been made on biparametric spectra and amplitude spectra, for a device according to prior art (with decoupling capacitor) and a device according to the invention (without a decoupling capacitor).

For the device according to prior art, results were obtained under the following conditions:

DP343 cobalt 57 source (3.2 MBq on 17/11/93), with 83% of photons emitted at 122 keV, tungsten collimator (φ 2.5 mm), CdZnTe 5×5×5 mm$^3$ spectrometric quality detector purchased from eV-Products No. eV-01100, polarization voltage: 250 Volts, optimized connections and detector-connecting capacitor distance, preamplifier No. eV-5093with connecting capacitor, 2$^{nd}$ drawer amplifier, acquisition and correction program developed on labview.

Figure 4A:
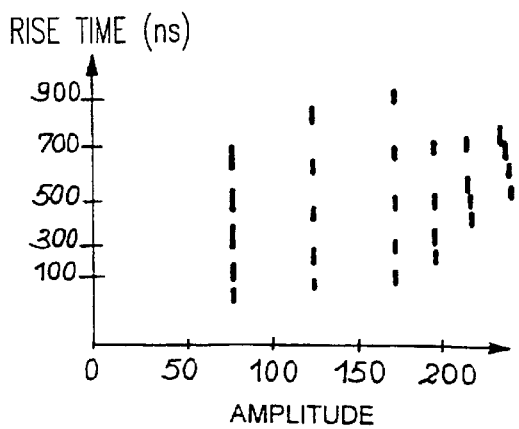
FIGS. 4A and 4B show the results of calibrating a biparametric measurement system.
Figure 4B:
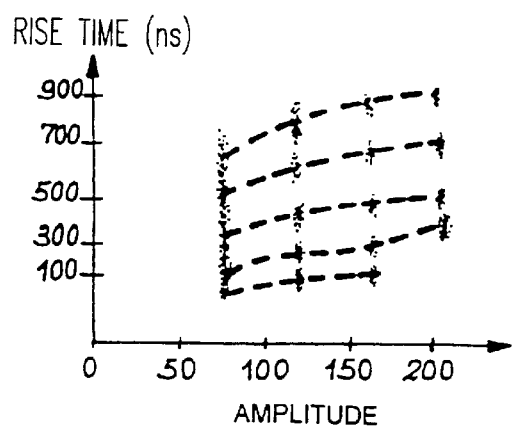

FIGS. 4A and 4B show the results obtained under the same conditions by injecting a signal calibrated in amplitude (high gain) and in time on a small capacitor simulating the detector, through a pulse generator. This measurement calibrates the acquisition system in amplitude and in time and identifies any non-linearities in order to deconvolute the influence of the detector and the electronic system on the measurement quality. It is found that times of 100 ns to 1 µs can be measured for amplitudes corresponding to 122 keV. The noise associated with the measurement is low for the amplifier alone (FIG. 4A) and much higher for the amplifier+the preamplifier (FIG. 4B).

Figure 5:
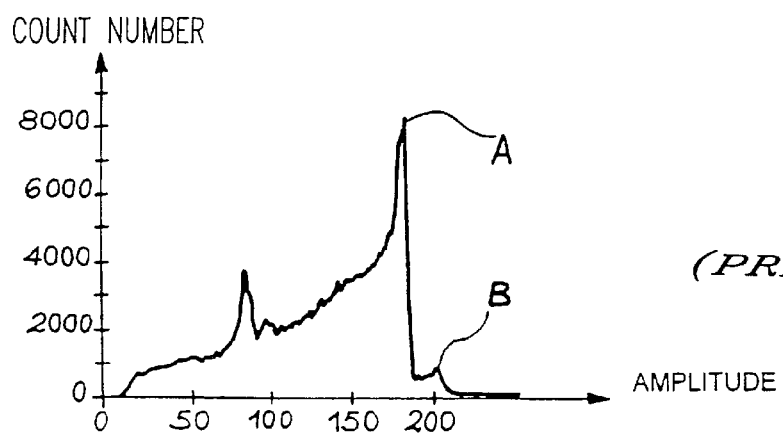
FIG. 5 shows an amplitude spectrum of a device according to prior art, with a decoupling capacitor.

FIG. 5 shows an amplitude spectrum for sample eV-01100.

An amplitude-rise time with low noise is observed over most of the amplitude and time range in the amplitude-rise time biparametric spectrum (not shown). This relation can be measured on the 122 keV peak, and especially on the 136 keV peak, which demonstrates the fineness of the measurement and consequently the quality of the electronics. A comparison between FIG. 4B and this type of spectrum shows that the noise associated with the measurement of the amplituderise time relation is largely due to the preamplifier and not to detector fluctuations. This relation between the amplitude and the rise time can correct the poor charge collection efficiency and thus improve detector performances. Vertical cursors at a spacing equal to twice the width at the mid-height of the peak can be used to evaluate the detection efficiency of the 122 keV peak at about 25%±2%. It is calculated by taking the (number counts between the two cursors)/(number of incident photons calculated using the activity of the source, the collimator, and the irradiation geometry comprising the collimator) ratio. The number of 122 keV incident photons is given by the rate of incident photons at its surface (Inc. Counts=420 photons/ second), the percentage of 122 keV photons emitted by the cobalt 57 source deducted from the photons that escape (85.7−3=83%) and the acquisition time (900 seconds).

FIG. 5 shows the amplitude spectrum. The polarization voltage was fixed at 250 volts, which degrades the peak to valley ratio (P/V=2 compared with P/V=3 at 850 Volts) and the energy resolution (R=11% compared with R=4.5% at 850 Volts).

The measurements presented above were made with a connecting capacitor between the detector and the preamplifier. This capacitor eliminates the influence of the average value of the darkness current.

According to the invention, this capacitor and the polarization resistance are eliminated. The chosen material has a very high resistance (resistivity greater than $10^9$ Ω·cm) and operates at a low voltage (for example between 100 and 500 V), at ambient temperature.

The advantage of imposing a low polarization voltage is to increase the electron transit time, which means that longer rise times can be measured with low noise. This remains possible provided that electrons created under the cathode (and largely responsible for the 122 keV peak) migrate throughout the entire detector thickness, in other words as long as the channel of the 122 keV peak remains constant. Therefore, a compromise needs to be found between the collection efficiency of electrons created under the cathode and the capability of the electronics to measure low electron rise times very close to the anode. This compromise depends on the detector thickness and the applied polarization voltage. The other advantage of working at a low polarization voltage is that a very low darkness current (10 nA to 100 nA) is obtained, resulting in slower aging of the detector and a reduction in the detector noise.

Apart from the fact that electron transit times are increased, which facilitates the measurement of the rise time associated with low amplitudes, the use of a low polarization voltage (250 Volts for a thickness of 5 mm) has other advantages:

the detector ages less quickly,
the risks of breakdowns are limited,
the noise associated with the darkness current is smaller and constant with time.

Figure 6:
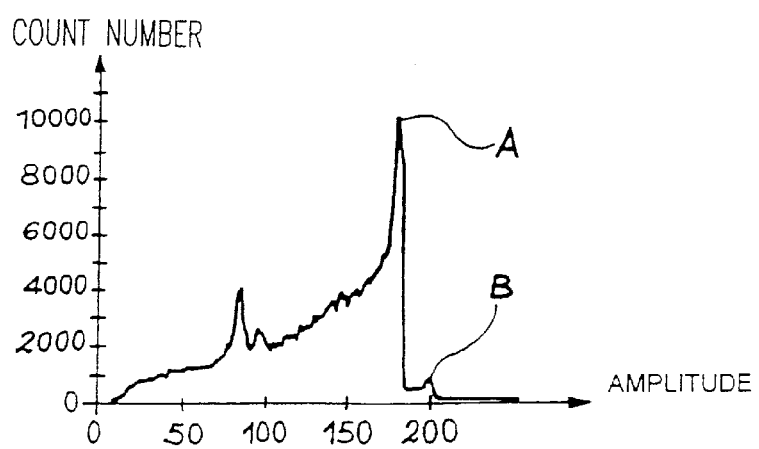
FIG. 6 shows an amplitude spectrum of a device according to the invention, without a decoupling capacitor.

FIG. 6 shows that the darkness current in a device according to the invention is sufficiently low to not saturate the preamplifier associated with the detector. Results have been obtained with a system identical to that described above, but without a decoupling capacitor.

The results show a significant improvement in the energy resolution: R=7% without a capacitor (FIG. 6) compared with R=11% with a capacitor (FIG. 5). Eliminating this connecting capacitor improved the noise associated with the detector signal, which improves the fineness of the amplitude-rise time relation (FIG. 6 without a capacitor, to be compared with FIG. 5 with a capacitor).

The advantages of the device according to the invention include the advantages mentioned above (limitation of aging, risks of breakdown, and darkness current noise).

Furthermore, better performances are observed (reduction in the measurement noise) and the cost is lower (the installation of a capacitor and a resistance is expensive).

Before any correction, a 5 mm thick spectrometric quality CdZnTe detector marketed by eV-Products has a detection efficiency of 26%±5% and an energy resolution of 5% at 122 keV.

The proposed correction method is based on the measurement of the electronic contribution to the signal, the electrons having much better transport properties than holes. It is described in document EP-763 751.

This method consists of measuring the relation between the amplitude and the rise time of the component of the electrons in the integrated signal. This relation is quasi-linear and has the advantage that it only depends on the mobility of the electrons that varies very little along an ingot, and from one ingot to another. This can improve the efficiency of detectors that can be corrected, and therefore used, for a gamma-camera.

This correction method is particularly efficient when the detector thickness is high and the polarization voltage is low; this increases the electron transit times and thus improves the noise associated with their measurement. Elimination of the connecting capacitor between the detector and the charge preamplifier improves the performances of the correction method by reducing the measurement noise.

A gamma-camera may be produced according to another aspect of the invention. For example, a 20×20 $cm^2$ camera may be made based on cadmium telluride, originating from the HPBM growth method and using the correction method described above. About 1600 detectors can be placed adjacent to each other with dimensions of about 4×4×6 $mm^3$. This type of imagery device in gamma radiation implies the manufacture of integrated electronics using ASIC technology associated with a group of detectors (4 or 16 detectors). This electronics may comprise means of producing the correction method described in document EP-763 751. This invention (operation of high resistivity detectors without a decoupling capacitor) can improve the performances of the imagery device in terms of energy resolution, and therefore image contrast, and can also reduce production costs due to the elimination of two electronic components (decoupling capacitor and polarization resistor).

What is claimed is:

1. Semiconductor based device for the detection of gamma radiation comprising:
    a semiconductor based detector with a resistivity exceeding $10^9$ Ω·cm,
    an operational preamplifier coupled to the detector,
    means for processing a signal or a plurality of signals or a set of data corresponding to the signal or the plurality of signals which are representative of the variation with time of a signal output by the said semiconductor based detector in response to the interaction of a γ photon with the semi-conducting material, said means for processing comprising means of producing data or a signal representative of the rise time of the electronic component of the total signal output by the detector, the electronic component being a component of the signal that corresponds to the collection of electrons originating from interaction between a γ photon and the semi-conducting material, and said means for processing further comprising means of producing data or a signal representative of the maximum electrical charge or the maximum electrical charge corresponding to at least part of a first data set representing the rise times of electronic components, and secondly a second data set representing the total detected charges or the charges resulting from the collection of electrons, and means of establishing a relation, or correlation, between the first and second data sets;
    wherein the semiconductor based device is configured such that the preamplifier is placed directly at the detector output, without a decoupling capacitor between the detector and the preamplifier, and in that the signal processing device comprises means of producing data or a signal representative of an amplitude of the electronic component of the signal, or an amplitude of the total signal.

2. Device according to claim 1, characterized in that the device for processing of a signal or a number of signals or a data set or a number of data sets each being representative of the variation with time of a signal output by the semiconductor based detector, also comprises means of producing data or a signal representative of either the total detected charge or the part of the total charge resulting from the collection of electrons.

3. Process for the detection of gamma radiation, making use of a device according to claim 1 at ambient temperature, and a processing step applicable to a signal or a set of data representative of the variation with time of a signal output by a semiconductor based detector in response to each interaction of a γ photon with the semi-conducting material, in which data or a signal is produced in the semi-conducting material representative of the rise time of the electronic component of the total signal output by the detector, the electronic component being a component of the total signal that corresponds to the collection of electrons originating from the interaction between each γ photon and the semi-conducting material.

4. Process according to claim 3, which also produces data or a signal representative of either the total detected charge or the part of the total charge resulting from the collection of electrons.

5. Process according to claim 3, in which data or a signal is produced representative of either the amplitude of the signal output by the detector, or the amplitude of the electronic component of the signal output by the detector.

6. Process according to claim 4, in which data or a signal is produced representative of either the amplitude of the signal output by the detector, or the amplitude of the electronic component of the signal output by the detector.

7. Process according to claim 3, in which the voltage applied to the detector is between 100 and 500 V.

8. Process according to claim 3, the detector operating at a determined voltage V, therefore having a determined maximum electron transit time te max, the preamplifier being associated with a counter-reaction capacitor Ci and a counter-reaction resistor Ri, where Ci and Ri are such that:

$Ti = Ri\ Ci \gg te\ max$.

9. Process according to claim 3, the detector having a darkness current Ip, the preamplifier being associated with a counter-reaction capacitor Ci and a counter-reaction resistor Ri, the preamplifier being powered at a voltage VDD, and Ri, Ip and VDD being such that:

$Ri\ Ip < VDD$.

10. Use at ambient temperature of a device for the detection of gamma radiation according to claim 1, the detector operating at a determined voltage V, therefore having a determined maximum electron transit time te max, the detector being associated with a counter-reaction capacitor Ci and a counter-reaction resistor Ri, where Ci and Ri are such that:

$Ti = Ri\ Ci \gg te\ max$.

11. Use at ambient temperature of a device for the detection of gamma radiation according to claim 1, the detector having a darkness current Ip, the detector being associated with a counter-reaction capacitor Ci and a counter-reaction resistor Ri, the preamplifier being powered at a voltage VDD, and Ri, Ip and VDD being such that:

$Ri\ Ip < VDD$.

12. Semiconductor based device for the detection of gamma radiation comprising:
    a semiconductor based detector with a resistivity exceeding $10^9\ \Omega \cdot cm$,
    an operational preamplifier coupled to the detector,
    means for processing a signal or a plurality of signals or a set of data corresponding to the signal or the plurality of signals which are representative of the variation with time of a signal output by the said semiconductor based detector in response to each interaction of a γ photon with the semi-conducting material, this device comprising means of producing data or a signal representative of the rise time of the electronic component of the total signal output by the detector, the electronic component being a component of the signal that corresponds to the collection of electrons originating from the each interaction between a γ photon and the semi-conducting material;

the semiconductor based device being configured such that the preamplifier is placed directly at the detector output, without a decoupling capacitor between the detector and the preamplifier, and in that the signal processing device comprises means of producing data or a signal representative of an amplitude of the electronic component of the signal, or an amplitude of the total signal, wherein the device for processing of a signal or a number of signals or a data set or a number of data sets each being representative of the variation with time of a signal output by the semiconductor based detector, also comprises means of producing data or a signal representative of the maximum electrical charge or the maximum charge corresponding to at least part of a first data set representing the rise times of electronic components, and secondly a second data set representing the total detected charges or the charges resulting from the collection of electrons, and means of establishing a relation, or correlation, between the first and second data sets.

13. Device according to claim 12, characterized in that the means of determining a maximum electrical charge comprise inputs for receiving a parameter associated with a start of processing, the parameter comprising signals or data selected from a group consisting of:
    the rise time of the electronic component of the signal,
    the total detected charge or the part of the total charge resulting from the collection of electrons, and
    starting from the relation, or correlation, between firstly the first data set and secondly the second data set.

14. Device according to claim 13, also comprising means of correcting the measured charge starting from the maximum charge, the rise time corresponding to this maximum charge, and the actually measured rise time.

15. Device according to claim 12, wherein a semiconductor material of the semiconductor based device is such that the product of the mobility of electrons by their life being greater than $10^{-4}\ cm^2/V$.

16. Device according to claim 12, the detector being made of CdTe or CdTe: Cl or CdZnTe:Cl or CdTeSe:Cl or CdZnTe or $HgI_2$ or $PbI_2$ or GaAs or PbIn.

17. Device according to claim 15, the detector being made of CdTe or CdTe:Cl or CdZnTe:Cl or CdTeSe:Cl or CdZnTe or $HgI_2$ or $PbI_2$ or GaAs or PbIn.

18. Device according to claim 12 the material from which the semiconductor is made being obtained using the HPBM method.

19. Device according to claim 12, thickness of the detector being between 3 mm and 6 mm.

20. Process for the detection of gamma radiation at ambient temperature making use of a device according to claim 13, and a step in which these signals are processed, the process comprising:
    obtaining a signal by the semiconductor based detector in response to each interaction of a γ photon to be measured with the semi-conducting material, determining a signal or set of data representative of the variation with time of a signal obtained by the semiconductor based detector, producing data or a signal representative of the rise time of the electronic component of the signal output by the detector, the electronic component being a component of the signal that corresponds to the collection of electrons originating from each interaction of a γ photon to be measured with the semiconducting material, producing data or a signal representative of either the total detected charge, or the part of the total charge resulting from the collection of electrons, determining a maximum electrical charge based upon signals or data associated with either:
the rise time of the electronic component of the signal, or
the total detected charge or the part of the total charge resulting from the collection of electrons, wherein the step of determining a maximum electrical charge starts from a relation, or correlation, between firstly a first data set representative of the rise times of the electronic components, and secondly a second data set representing either the total detected charges or the parts of the total charges resulting from the collection of electrons.

21. Process for the detection of gamma radiation at ambient temperature making use of a semiconductor based device for the detection of gamma radiation comprising a semiconductor based detector with a resistivity exceeding $10^9$ Ω·cm, an a semiconductor based detector with a resistivity exceeding $10^9$ Ω·cm, an operational preamplifier coupled to the detector, means for processing a signal or a plurality of signals or a set of data corresponding to the signal or the plurality of signals which are representative of the variation with time of a signal output by the said semiconductor based detector in response to each interaction of a γ photon with the semi-conducting material, this device comprising means of producing data or a signal representative of the rise time of the electronic component of the total signal output by the detector, the electronic component being a component of the signal that corresponds to the collection of electrons originating from each interaction between a γ photon and the semi-conducting material; semiconductor based device being characterized in that the preamplifier is placed directly at the detector output, without a decoupling capacitor between the detector and the preamplifier, and in that the signal processing device comprises means of producing data or a signal representative of an amplitude of the electronic component of the signal, or an amplitude of the total signal, wherein the process for the detection of gamma radiation comprises:

processing a plurality of signals or a plurality of data sets, each of which is representative of the variation with time of the signals output by the semiconductor based detector, producing, using the plurality of signals or the plurality of data sets, data or a signal representative of the rise time of the electronic component of the signal output by the detector, the electronic component being a component of the total signal that corresponds to the collection of electrons originating from the interaction of each γ photon with the semi-conducting material, establishing a relation, or a correlation, between firstly a first set of data representing the rise times of electronic components, and secondly a second data set representing total detected charges, or charges resulting from the collection of electrons.

22. Process according to claim 21 that also determines or produces data or a signal representative of the maximum electronic charge or the maximum charge corresponding to at least part of the first and second data sets.

23. Process for the detection of gamma radiation at ambient temperature making use of a semiconductor based device for the detection of gamma radiation comprising a semiconductor based detector with a resistivity exceeding $10^9$ Ω·cm, an operational preamplifier coupled to the detector, means for processing a signal or a plurality of signals or a set of data corresponding to the signal or the plurality of signals which are representative of the variation with time of a signal output by the said semiconductor based detector in response to each interaction of a γ photon with the semi-conducting material, this device comprising means of producing data or a signal representative of the rise time of the electronic component of the total signal output by the detector, the electronic component being a component of the signal that corresponds to the collection of electrons originating from each interaction between a γ photon and the semi-conducting material, the semiconductor based device being configured such that the preamplifier is placed directly at the detector output, without a decoupling capacitor between the detector and the preamplifier, and in that the signal processing device comprises means of producing data or a signal representative of an amplitude of the electronic component of the signal, or an amplitude of the total signal, wherein the device for processing of a signal or a number of signals or a data set or a number of data sets each being representative of the variation with time of a signal output by the semiconductor based detector, also comprises means of producing data or a signal representative of the maximum electrical charge or the maximum charge corresponding to at least part of a first data set representing the rise times of electronic components, and secondly a second data set representing the total detected charges or the charges resulting from the collection of electrons, and means of establishing a relation, or correlation, between the first and second data sets, the process for the detection of gamma radiation comprising:

obtaining a signal by the semiconductor based detector in response to each interaction of a γ photon to be measured with the semi-conducting material, determining a signal or set of data representative of the variation with time of a signal obtained by the semiconductor based detector, producing data or a signal representative of the rise time of the electronic component of the signal output by the detector, the electronic component being a component of the signal that corresponds to the collection of electrons originating from each interaction of a γ photon to be measured with the semiconducting material, producing data or a signal representative of either the total detected charge, or the part of the total charge resulting from the collection of electrons, determining a maximum electrical charge based upon signals or data associated with either:
the rise time of the electronic component of the signal, or
the total detected charge or the part of the total charge resulting from the collection of electrons, wherein the step of determining a maximum electrical charge starts from a relation, or correlation, between firstly a first data set representative of the rise times of the electronic components, and secondly a second data set representing either the total detected charges or the parts of the total charges resulting from the collection of electrons, and wherein the measured charge is corrected using the maximum charge, the rise time corresponding to this maximum charge, and the rise time actually measured.

24. A gamma radiation detection apparatus comprising:

a semiconductor-based gamma radiation detector configured to detect γ photons of the gamma radiation, wherein the semiconductor radiation detector has a resistivity of at least $10^9$ Ω·cm;

an operational preamplifier coupled directly to the semiconductor-based gamma radiation detector;

a threshold detector coupled to an output of the operational preamplifier and configured to detect a signal which has reached a minimum threshold;

a peak detector coupled to the output of the operational preamplifier and configured to detect the peak of the signal; and a processor coupled to the threshold detector and coupled to the peak detector, and configured to receive a rise time of the signal based upon inputs from the threshold detector and the peak detector;

wherein the processor is configured to compensate for losses of the gamma radiation detection apparatus and determine a level of gamma radiation based upon the peak of the signal and the rise time.

25. A gamma radiation detection apparatus according to claim 24, wherein the operational preamplifier is coupled directly to the detector without a decoupling capacitor and without polarization resistance between the preamplifier and the detector.

26. A gamma radiation detection apparatus according to claim 24, wherein the operational preamplifier is a charge preamplifier and the gamma radiation detection apparatus further comprises:

a gain preamplifier coupled to the charge preamplifier.

27. A gamma radiation detection apparatus according to claim 24, further comprising:

a discriminator coupled to the processor, to the threshold detector and to the peak detector, and configured to determine a rise time of the signal based upon inputs from the threshold detector and the peak detector.

28. A gamma radiation detection apparatus according to claim 24, further comprising:

a correlator coupled to the processor, and configured to correlate the rise time and the peak of the signal.

* * * * *

UNITED STATES PATENT AND TRADEMARK OFFICE
CERTIFICATE OF CORRECTION

PATENT NO. : 6,420,710 B1
DATED : July 16, 2002
INVENTOR(S) : Verger et al.

It is certified that error appears in the above-identified patent and that said Letters Patent is hereby corrected as shown below:

<u>Title page,</u>
Item [22], the PCT Filing should read:
-- [22] PCT Filed: Aug. 14, 1998 --

Signed and Sealed this

Seventh Day of January, 2003

JAMES E. ROGAN
*Director of the United States Patent and Trademark Office*